United States Patent [19]
Uchida et al.

[11] Patent Number: 5,918,365
[45] Date of Patent: Jul. 6, 1999

[54] WIRE HARNESS MANUFACTURING METHOD

[75] Inventors: Kiyoshi Uchida; Makoto Nakayama; Masatoshi Nakasone; Hiroshi Suzuki; Takayuki Kato; Toshio Inada, all of Shizuoka-ken, Japan

[73] Assignee: Yazaki Corporation, Tokyo, Japan

[21] Appl. No.: 08/974,195

[22] Filed: Nov. 19, 1997

Related U.S. Application Data

[62] Division of application No. 08/678,632, Jul. 10, 1996.

[30] Foreign Application Priority Data

Jul. 20, 1995 [JP] Japan .................................. 7-184356

[51] Int. Cl.$^6$ .................................................. H01R 43/00
[52] U.S. Cl. .............................. 29/868; 29/869; 29/755; 174/72 A
[58] Field of Search ........................... 29/868, 755, 869; 174/72 A

[56] References Cited

U.S. PATENT DOCUMENTS 4,000,558  1/1977  Cahill .

FOREIGN PATENT DOCUMENTS 05135632  6/1993  Japan .
7-163033   6/1995  Japan .

*Primary Examiner*—Carl J. Arbes
*Attorney, Agent, or Firm*—Finnegan, Henderson, Farabow, Garrett & Dunner, L.L.P.

[57] ABSTRACT

A wire harness consists of electrical wires, a first resin sheet and a second resin sheet. The first resin sheet includes a recess formed so as to extend along a predetermined "three-dimensional" wiring route of the electrical wires. In order to manufacture the wire harness, at first, the recess is formed in the first resin sheet. Then, the electrical wires are arranged in the recess. Next, the second resin sheet is arranged on the first resin sheet so as to cover the recess and air contained in a space defined between the first resin sheet and the second resin sheet is sucked to the outside. Finally, the first resin sheet and the second resin sheet are joined to each other. Owing to the provision of the three-dimensional recess, it is possible to realize the wire harness having a three-dimensional configuration following to the actual wiring route of the electrical wires, so that the assembling property can be improved.

2 Claims, 18 Drawing Sheets

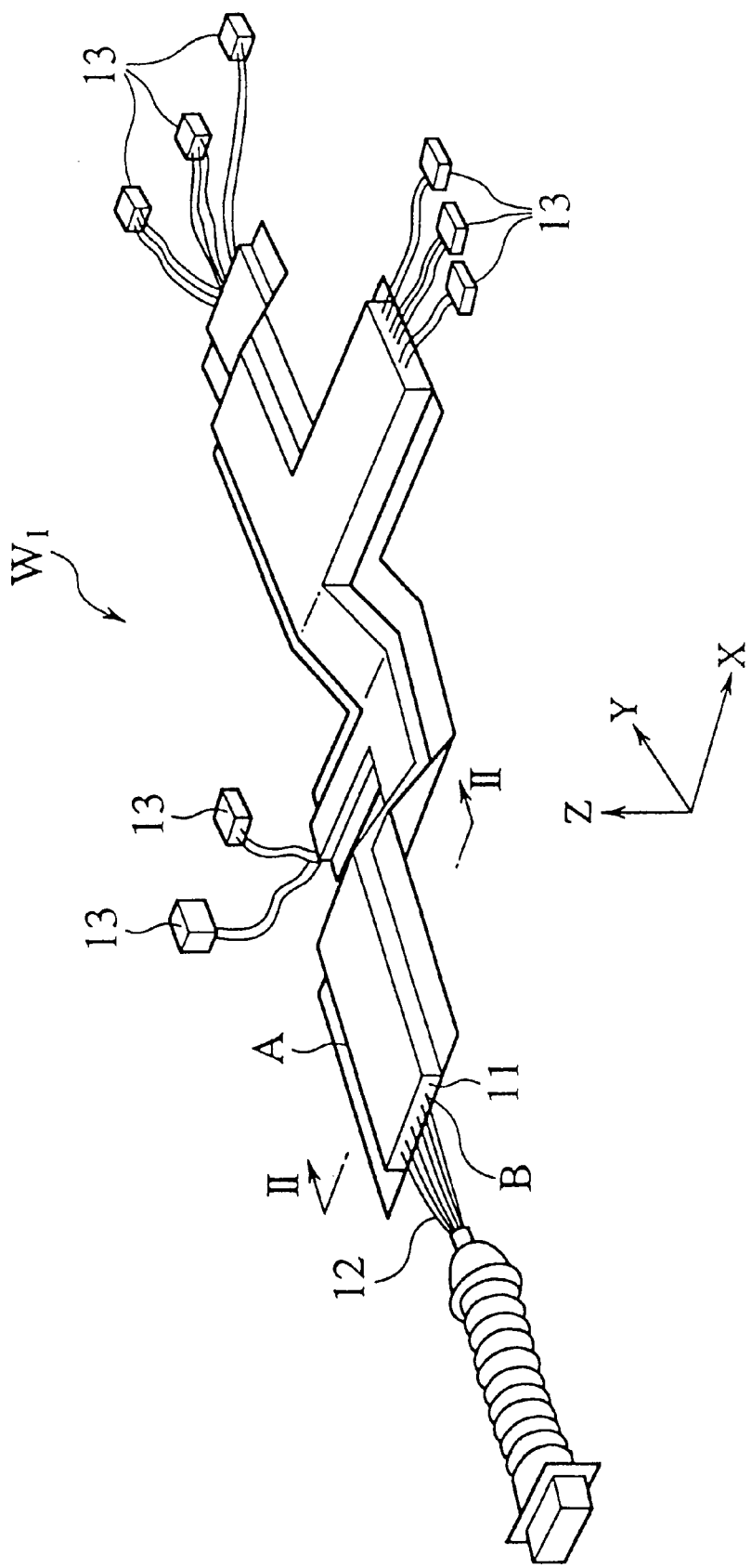

WIRE HARNESS MANUFACTURING METHOD

This is a division of application Ser. No. 08/678,632, filed Jul. 10, 1996.

BACKGROUND OF THE INVENTION

The present invention relates to a wire harness and a method of manufacturing the wire harness. Particularly, it relates to a wire harness having a predetermined configuration while interposing electrical wires between two sheets of resinous materials for the purpose of the improvement in assembling property to a vehicle body or the like, and a method of manufacturing the wire harness.

In prior arts, Japanese Unexamined Patent Publications (kokai) Nos. 5-314833, 62-290307 and 6-28922 and Japanese Unexamined Utility Model Publications (kokai) No. 62-192508, etc. disclose a flat wire harness consisting of two resin sheets between which electrical wires are interposed.

Now, we describe a method of manufacturing the flat conventional wire harness in brief.

First of all, a flat sheet for mounting the wires thereon is mounted on an upper flat suction plate. The flat sheet is provided with many suction holes.

Next, upon wiring electrical wires on the flat sheet, it is covered with a cover film. Then, by sucking air between the flat sheet and the cover film through the suction holes, the sheet, the electrical wires and the cover film are stuck to each other. Hereat, since hot-melt adhesive agent has been previously pasted on an under face of the cover film, the above suction is carried out under condition that the cover film is softened by a heater while the hot-melt adhesive agent is melted.

Consequently, the air between the sheet and the cover film is sucked, so that the cover film sticks to the sheet certainly. During the sucking, the softened cover film is so deformed and stuck as to follow to a wiring route for the electrical wires, while the cover film is joined to the sheet by means of the adhesive agent melted, providing a flat-shaped wire harness in form of the integrated structure.

In this way, a shape of the conventional wire harness has been limited to a so-called "two-dimensional" configuration (flat shape) since the electrical wires are arranged on a flat base or a sheet. Therefore, such a limited configuration causes the number of vehicle body's spots for attachment with the wire harness to be decreased correspondingly.

However, it should be noted that there are a lot of spots of the vehicle body where the electrical wires have to be wired through a "three-dimensional" route with great changes in wiring level height, in comparison with the number of spots where the electrical wires are to be wired through a two-dimensional wiring route. Thus, it has been desired an improvement in assembling property of the wire harness.

SUMMARY OF THE INVENTION

It is therefore an object of the present invention to provide a wire harness which is suitable for wiring the electrical wires to the vehicle body or the like through a so-called "three-dimensional" wiring route.

The object of the present invention described above can be accomplished by a wire harness comprising:
electrical wires;
a first resin sheet having a recess formed so as to extend along a predetermined wiring route of the electrical wires; and
a second resin sheet joined to the first resin sheet tightly so as to cover at least the recess of the first resin sheet;
wherein the electrical wires are accommodated in the recess and the second resin sheet is provided by vacuum molding.

With the arrangement mentioned above, it is possible to realize the wire harness having a configuration (two or three dimensional shape) following to the actual wiring route of the electrical wires.

In the present invention, preferably, the first resin sheet is formed to have a three-dimensional configuration. In such a case, the resulting wire harness constitutes a three-dimensional shape.

Preferably, the second resin sheet is made from a thermoplastic film which is softer than the first resin sheet. In manufacturing the wire harness having such a second resin sheet, by vacuum-molding the second resin sheet while softening it by heating, it is possible to stick the second resin sheet to the first resin sheet securely.

In the present invention, preferably, the first resin sheet and the second resin sheet are joined to each other by means of adhesive agent which is pasted on at least either one of the first and second resin sheets. In this case, it is possible to join both of the first and second resin sheets to each other simultaneously with the vacuum-molding of the second resin sheet. Further, in case of pasting the adhesive agent on the first resin sheet, it is possible to prevent the previously-wired electrical wires from raising at the time of wiring the new electrical wires.

Alternatively, it is preferable that the adhesive agent is pasted on both surfaces of the second resin sheet in a manner that the second resin sheet is joined to the first resin sheet by means of the adhesive agent pasted on one of the surfaces, while a peel paper is pasted on the other of the surfaces. In this wire harness, by peeling the peel paper off the other surface, it allows the wire harness to be stuck on a vehicle body or the like.

Preferably, a space defined between the first resin sheet and the second resin sheet is filled up with plastic sealant for sealing up clearances among both of the first and second resin sheets and the electric wires. In this case, owing to the plastic sealant, not only waterproof capability but suction efficiency of the wire harness during vacuum-molding can be improved because of the removal of clearance.

Preferably, either one of the first resin sheet and the second resin sheet is provided with a through hole through which the electric wires are partially drawn out and the plastic sealant is arranged about the electric wires drawn, thereby to seal a clearance between the through hole and the electric wires. In the wire harness, it is possible to seal the clearance about, for example, branch wires of the electrical wires. Thus, not only waterproof capability but suction efficiency of the wire harness during vacuum-molding can be improved.

Preferably, at least either one of the first resin sheet and the second resin sheet is provided with attachment holes for attachment with an object to which the wire harness is to be attached. According to this preferred embodiment, if only passing screws through the attachment holes, it is possible to fix the wire harness to the object. Alternatively, with the engagement of clips into the attachment holes, the wire harness can be fixed to the object.

It is also preferable that the first resin sheet has projecting clips to be fitted in engagement holes provided in the object. In this case, by fitting the clips in the engagement holes of the object respectively, it is possible to fix the wire harness to the object quickly.

In the above-mentioned embodiment, more preferably, the clips are constituted by different members from the first and second resin sheets, each of the clips consisting of a leading part to be inserted into a through hole formed on either one of the first and second resin sheets and a base part to be held between the first and second resin sheets. According to this preferable embodiment, it is possible to produce a clearance between the clip and the through hole at the time of vacuum-molding the second resin sheet. Thus, by making use of the clearance, the air existing between the first and second resin sheets can be drawn out of the wire harness for vacuum.

Alternatively, it is preferable that each of the clips is constituted by a projection which is formed in one body with the first resin sheet so as to project from a surface of the first resin sheet opposing to another surface on which the recess is formed. Owing to a provision of the clips with the first resin sheet, it is not necessary to prepare the other clip members in order to fix the wire harness.

According to the present invention, there is also provided a method of manufacturing a wire harness having a first resin sheet, electrical wires and a second resin sheet joined, the method comprising:

a first step of forming the first resin sheet so as to have a recess extending along a predetermined wiring route of the electrical wires;

a second step of wiring the electrical wires in the recess formed at the first step; and a third step of putting the second resin sheet on the first resin sheet in a manner that the second resin sheet covers at least the recess;

a fourth step of sucking air between the first resin sheet and the second resin sheet so that the first resin sheet is stuck to the second resin sheet while interposing the electrical wires therebetween; and a fifth step of joining the first resin sheet and the second resin sheet to each other.

According to the above-mentioned method, since the first resin sheet is so formed as to have the recess extending along the wiring route of the electrical wires, it is possible to make the final shape of the wire harness to be a specific shape following to the actual wiring route of the electrical wires, for example, a three-dimensional configuration.

In the present method, preferably, the first step further comprises a step of boring a suction hole in the first resin sheet after or simultaneously with the forming the first resin sheet so as to have the recess extending along the wiring route of the electrical wires. In this preferred method, at the fourth step, the air between the first and second resin sheet is sucked from the suction hole, so that the first resin sheet is stuck to the second resin sheet while interposing the electrical wires therebetween.

The above and other features and advantages of the present invention will be more apparent, and the invention itself will best be understood, from a study of the following description and appended claims, with reference to the attached drawings showing preferred embodiments of the invention.

BRIEF DESCRIPTION OF THE DRAWINGS

FIG. 1 is a perspective view of a wire harness in accordance with a first embodiment of the present invention.

DESCRIPTION OF THE PREFERRED EMBODIMENT

A variety of embodiments of the present invention will be described with reference to the drawings.

FIGS. 1 shows a wire harness W1 in accordance with the first embodiment of the invention. The wire harness W1 consists of two pieces of first and second resin sheets A, B and electrical wires 12 interposed therebetween. Respective terminals of the electrical wires 12 are connected to connectors 13.

Being constituted by a thermoplastic sheet in form of a hard panel, the first resin sheet A is molded to have a so-called "three-dimensional" configuration with a recess 11 extending along the actual wiring route for the electrical wires 12. Regarding a method of producing the sheet A, it is at the option of the manufacturer to take which one of the known molding methods, for example, the injection molding, the "different-die" type extruding or the like. In this embodiment, the thermoplastic sheet is formed to have a predetermined three-dimensional configuration by the vacuum molding. That is, the first resin sheet A is so formed as to have some undulations in a direction of the Z axis of the shown X-Y-Z coordinates, providing a configuration suitable for a vehicle body as an object for attachment.

After wiring the electric wires 12 in the recess 11 of the first resin sheet A, the recess 11 is covered with the second resin sheet B made of a thin and soft film. Being subjected to the vacuum-molding (deformation by suction), the second resin sheet B can be fitted on the first resin sheet A tightly, so that the electric wires 12 can be held in the recess 11 immovably.

Figure 2A:
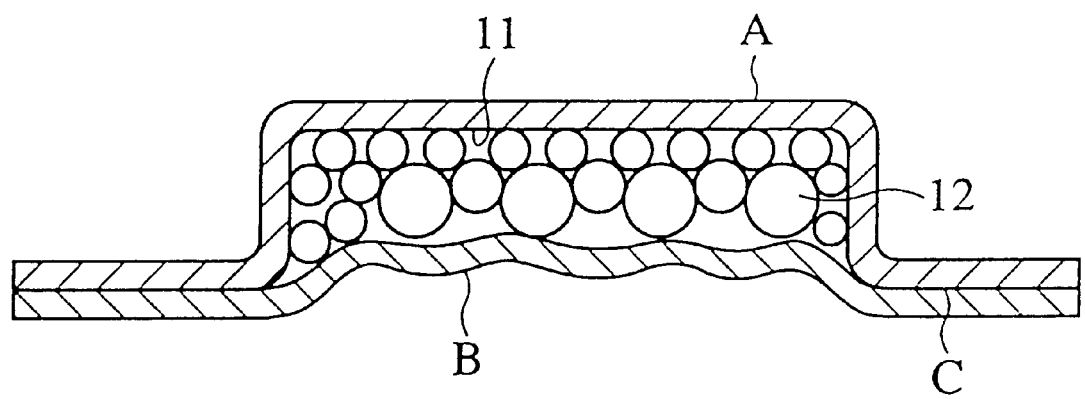
FIG. 2A is a cross sectional view of the wire harness, taken along a line II—II of FIG. 1.
Figure 2B:
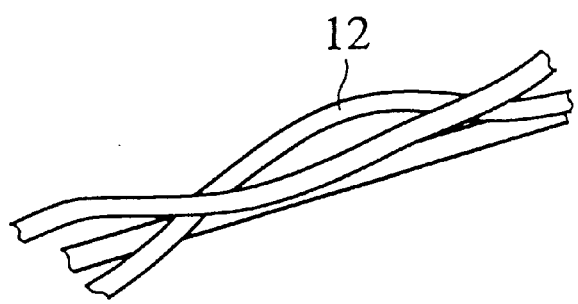
FIG. 2B is a perspective view showing intersecting electrical wires.

As shown in FIG. 2A, the electric wires 12 are accommodated in the recess 11 and depressed by the second resin sheet B sticking to the wires 12 by suction for vacuum. In connection, even if the wires 12 intersect each other as shown in FIG. 2B, there would not be caused no problem. Finally, the first resin sheet A and the second resin sheet B are joined to each other through the intermediary of the "hot melt" type adhesive agent C, at the same time of the above suction for vacuum. Butyl, acrylic material, silicon rubber or the like may be available for the adhesive agent C. It is noted that, in the embodiment, the vacuum-molding applied for the second resin sheet B is similar to the method disclosed in Japanese Unexamined Patent Publication (kokai) No. 5-314833. After joining the first resin sheet A and the second resin sheet B to each other, a margin of the assembled wire harness is trimmed, so that the wire harness W1 as shown in FIG. 1 can be completed.

In this way, since the wire harness W1 is formed to have the three-dimensional configuration along a profile of an attachment spot on the side of the vehicle body, the assembling property and mounting condition of the wire harness W1 to the vehicle body can be improved, so that it is possible to prevent an occurrence of noise. In assembling, since a worker has only to wire the electrical wires 12 in line with the actual wiring route, the wire harness W1 of the invention can be provided easily by making use of the existing bundle of electrical wires. Furthermore, since the wires 12 can be protected between the first resin sheet A and the second resin sheet B, it is possible to prevent the wires 12 from being damaged accidentally.

We now describe an attachment part of the wire harness W1 to be attached to the vehicle body.

Figure 3:
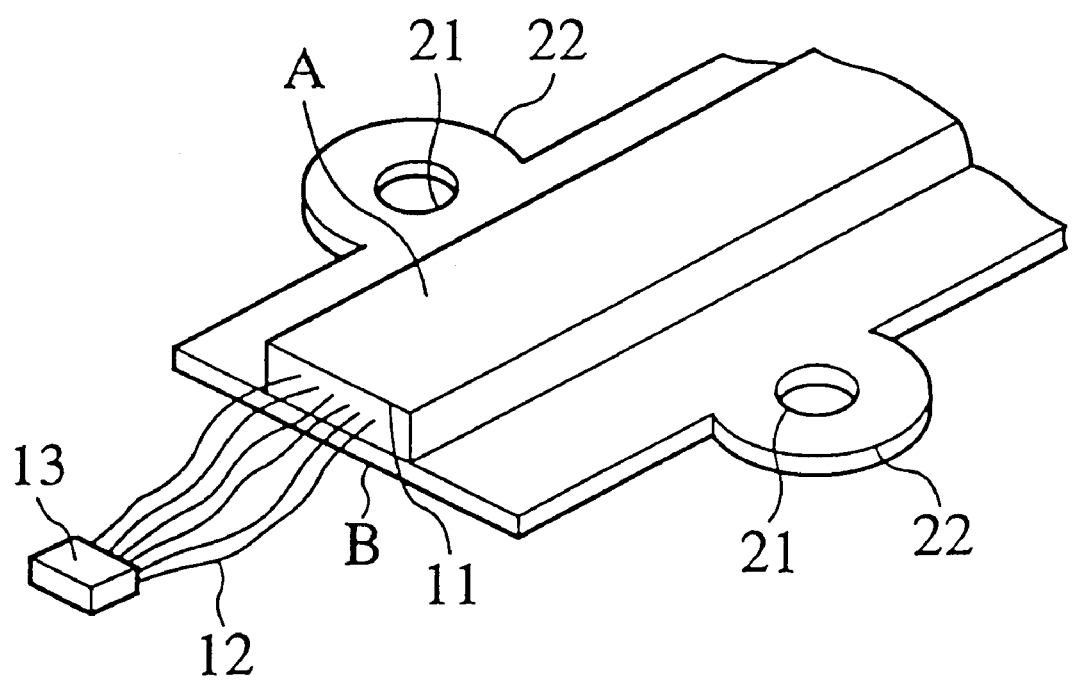
FIG. 3 is a perspective view of the wire harness, showing an example of an attachment part of the wire harness which is applicable to the first embodiment of the invention.

As one example, FIG. 3 shows attachment portions of the wire harness W1. In the embodiment, when the wire harness is trimmed, a plurality of flanges 22 are formed to have attachment holes 21 in an engagement region of the first resin sheet A with the second resin sheets B. In this case, by screwing not-shown screws into the attachment holes 21 respectively, it is possible to secure the wire harness W1 on the vehicle body. Alternatively, in case that attachment clips are prepared on the side of the vehicle body, the wire harness W1 would be fixed to the vehicle body if only fitting the attachment clips in the attachment holes 21, respectively.

Figure 4:
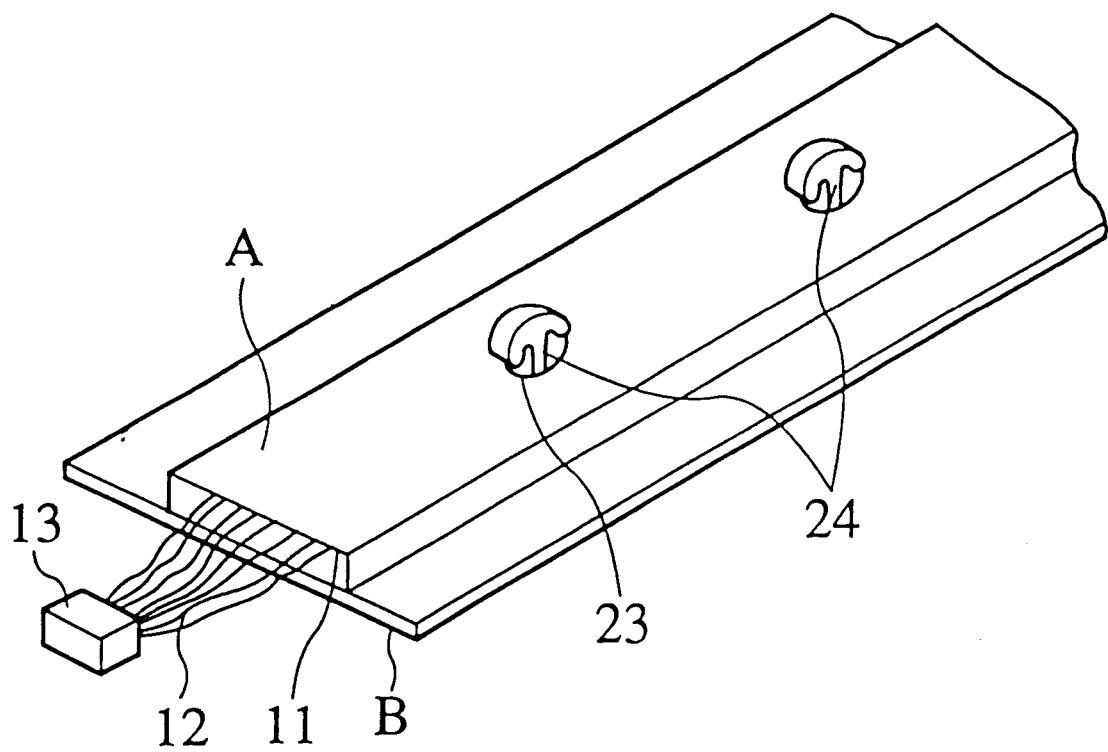
FIG. 4 is a perspective view of the wire harness having clips, showing another example of the attachment part which is applicable to the first embodiment of the invention.

FIG. 4 shows another wire harness in which clips 24 are arranged on a bottom of the recess 11 of the first resin sheet A to project to the outside. In this case, being made of material different from that of the resin sheets A, B, the clips 24 are assembled in the first resin sheet A prior to the vacuum-molding of the second resin sheet B.

Figure 5A:
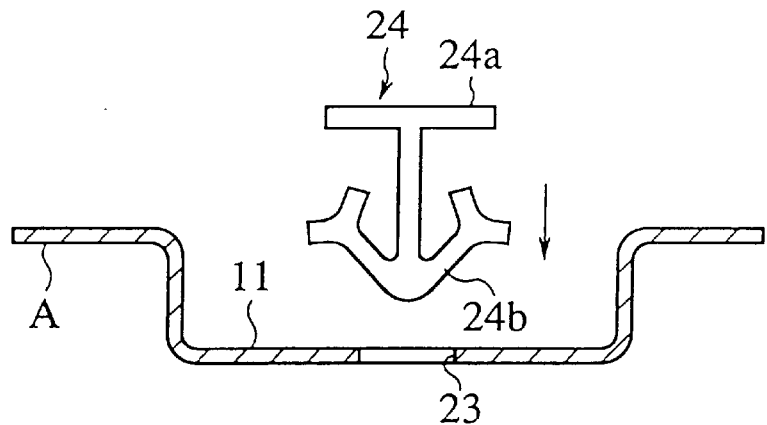
FIG. 5A is a partial cross sectional view of the wire harness of FIG. 4 under condition before inserting the clip into a resin sheet.
Figure 5B:
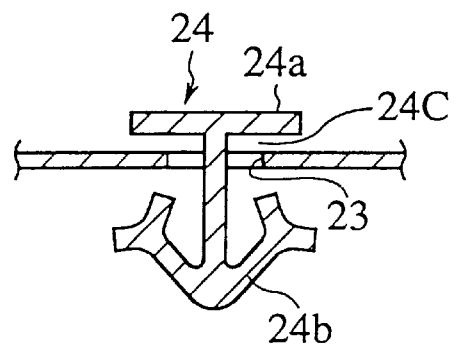
FIG. 5B is a partial cross sectional view of the wire harness of FIG. 4 under condition after inserting the clip into the resin sheet.
Figure 5C:
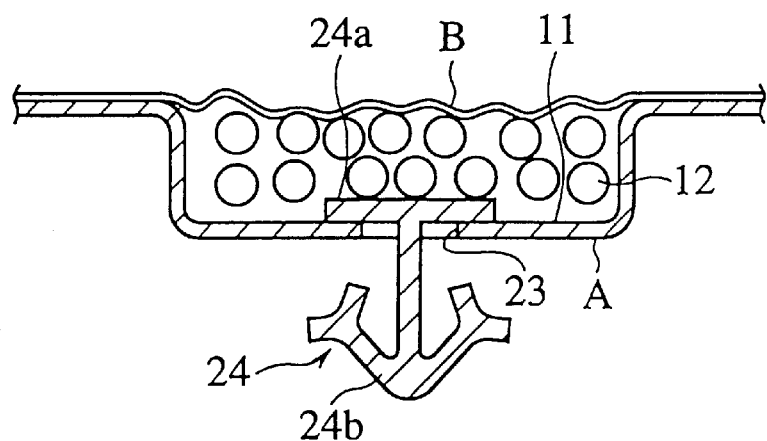
FIG. 5C is a partial cross sectional view of the wire harness of FIG. 4 under its assembled condition.

As shown FIGS. 5A and 5B, each clip 24 is provided with a leading part 24b which is to be inserted into a through hole 23 of the first resin sheet A from an interior side of the recess 11 so as to project to the outside. The clip 24 further includes a base part 24a which is adapted so as to abut on the margin of the through hole 23 on the interior side of the recess 11. In assembling, after wiring the electric wires 12, the second resin sheet B is formed by the vacuum-molding. Consequently, the base part 24a can be held between the first and second resin sheets A and B through the wires 12, as shown in FIG. 5C.

As to the insertion of the clip 24 into the through hole 23, a clearance 24c is defined between the clip 24 and the hole 23, as shown in FIG. 5B. Thus, it is also possible to suck the air out of a space defined between the first and second resin sheets A and B by means of the clearance 24c. In such a case, there would be no need to provide another suction hole in the first resin sheet A with the proviso that such an elimination of the suction hole depends on the positions and numbers of the clips 24.

Figure 6:
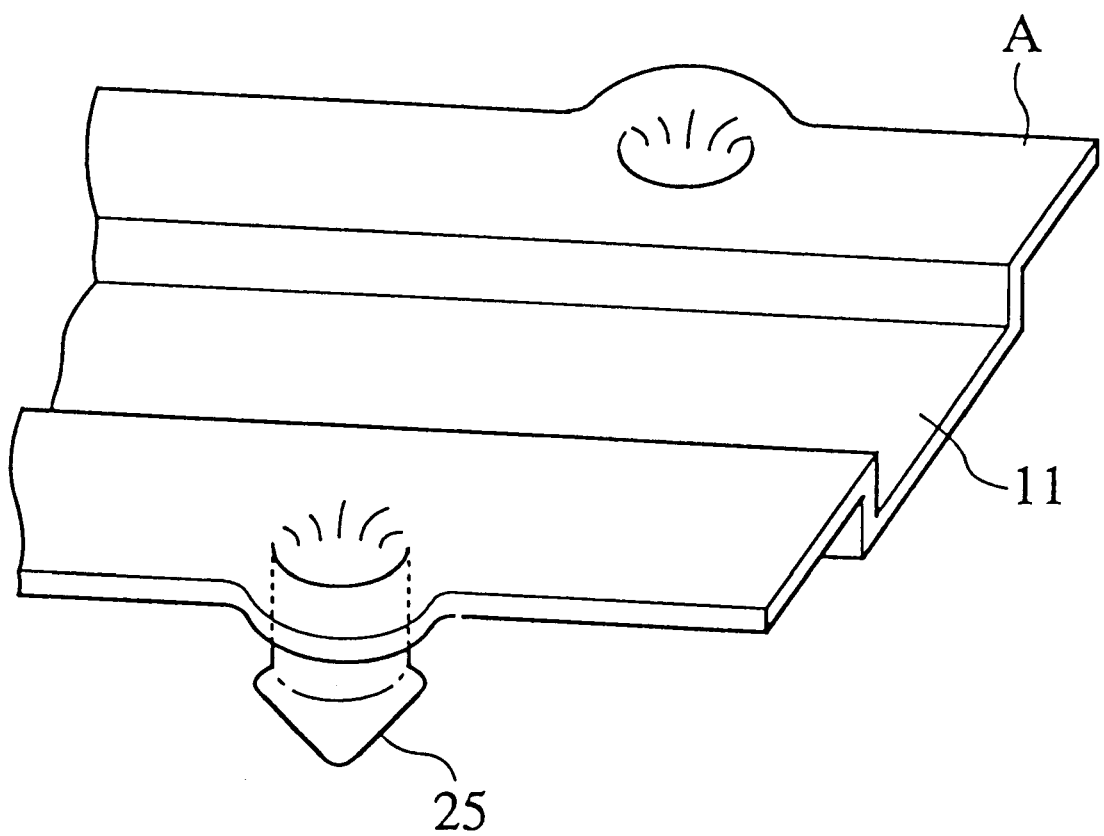
FIG. 6 is a perspective view of the wire harness having clips integrated with the resin sheet, showing the other example of the attachment part which is applicable to the first embodiment of the invention.

FIG. 6 shows an example of forming clip-shaped projections 25 on the first resin sheet A in a body at the same time of the formation of the recess 11. Each of the projections 25 is cylindrical-shaped like a pouch, provided with an elastic shrinkable tip having a large diameter. Owing to the elasticity of the tip, the projections 25 can be fitted in engagement holes formed in an object for attachment with the wire harness, respectively. In this case, since the projections 25 corresponding to the above-mentioned clips are formed in integral with the first resin sheet, there is no need to prepare additional clip members thereby to reduce the number of parts.

We now describe a method of manufacturing the above-mentioned wire harness having a three-dimensional configuration.

FIGS. 7 to 16 are explanatory diagrams of the method. Note, in these figures, the configuration of the wire harness are simplified.

Figure 7:
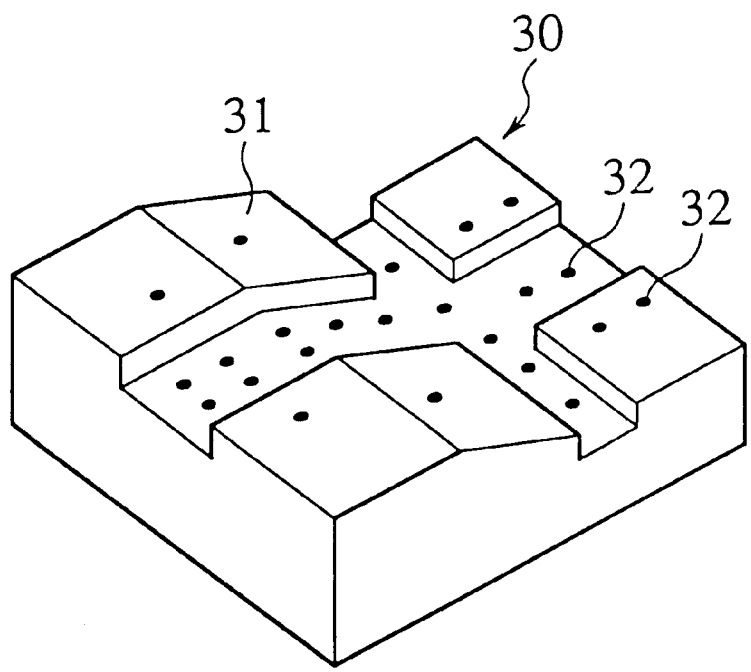
FIG. 7 is a perspective view of a mold for executing a first step of a method of manufacturing the wire harness in accordance with the first embodiment of the invention.

Prior to manufacturing the wire harness, it is prepared of a vacuum-molding die 30 having a three-dimensional configuration following to the actual wiring route of the electrical wires, as shown in FIG. 7. Beside a metallic mold as an example in the embodiment, the molding die 30 may be constituted by either of a resinous mold and a wooden mold. The die 30 is provided with an appropriate number of suction holes 32 on the upper face as a molding face.

Figure 8:
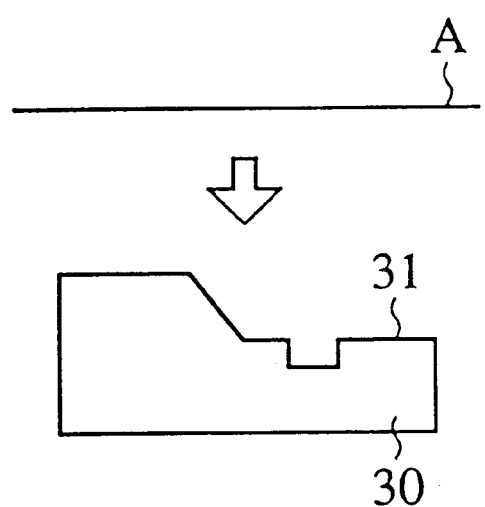
FIG. 8 is an explanatory diagram of the method of manufacturing the wire harness in accordance with the first embodiment of the invention, showing a condition to carry out the first step.
Figure 9:
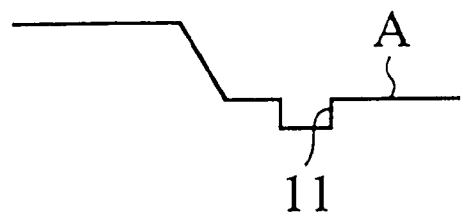
FIG. 9 is an explanatory diagram of the method of manufacturing the wire harness, showing a first resin sheet provided by the first step.

As shown in FIG. 8, the first resin sheet A made of thermoplastic material is arranged on the top face of the vacuum-molding die 30 at the first step, so that the recess 11 can be formed on the sheet A by the vacuum-molding process, as shown in FIG. 9.

Figure 10:
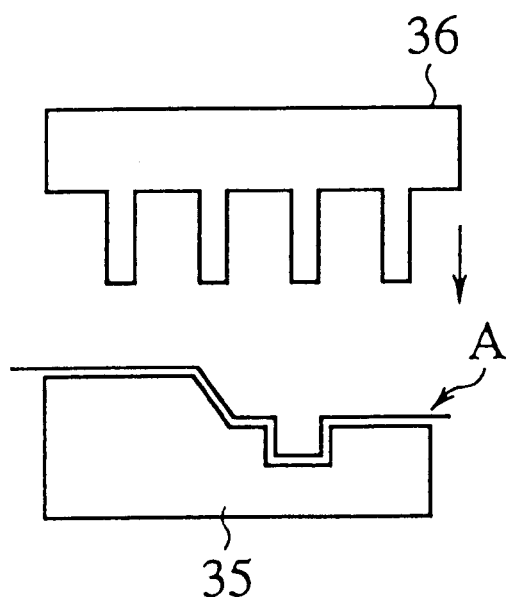
FIG. 10 is an explanatory diagram of the method of manufacturing the wire harness, showing a condition that a suction hole is formed in the first resin sheet after the first step.

Next, the suction holes for vacuum-molding the second resin sheet B are punched in the first resin sheet A. The punching is carried out when the first resin sheet A after the first step is transferred between a lower die 35 and an upper die 36 of a press, as shown in FIG. 10. Alternatively, in case of the vacuum-molding die 30 itself having a function of press-punching, there would be no need to transfer it. In either case, after punching the suction holes, the first resin sheet A is positioned on the vacuum-molding die 30 again.

Figure 11:
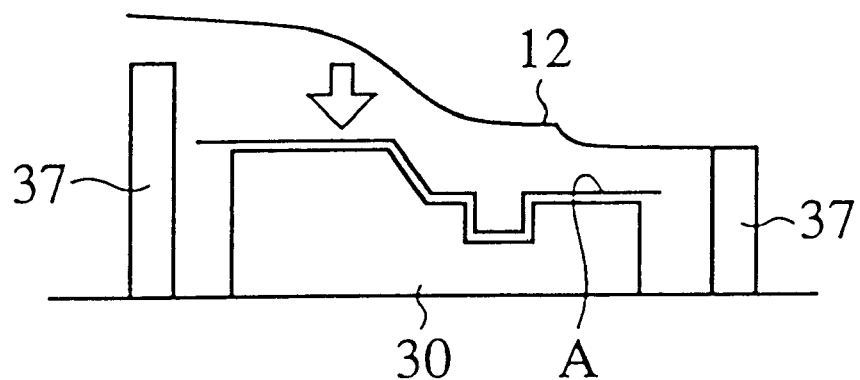
FIG. 11 is an explanatory diagram of the method of manufacturing the wire harness, showing a condition that the electrical wires are arranged in a second step after the completion of the first step.
Figure 12:
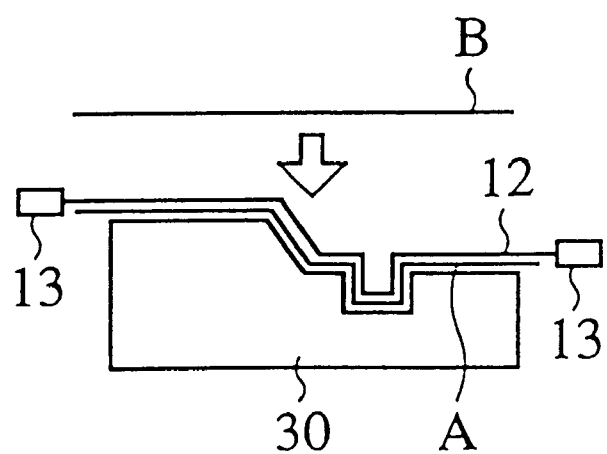
FIG. 12 is an explanatory diagram of the method of manufacturing the wire harness, showing a condition that the first resin sheet is covered with a second resin sheet in a third step after carrying out the second step.

Next, as the second step, the electrical wires 12 are arranged on the first resin sheet A over the vacuum-molding die 30, as shown in FIG. 11. Then, the provision of the recess 11 facilitates a worker's wiring operation for the electrical wires 12. Further, in case that the first resin sheet A has the adhesive agent pasted on the top face, the easiness of wiring would be further progressed since the adhesive agent serves to prevent the wires 12 in position from rising from the top face.

At the third step, the first resin sheet A having the electrical wires 12 wired is overlaid with the second resin sheet B. Then, by sucking the air between the first resin sheet A and the second resin sheet B on condition of softening the second resin sheet B by heat, the second resin sheet B can be deformed in a vacuum so as to follow to an upper profile of the first resin sheet A (the fourth step).

Hereat, since the "hot-melt" type of adhesive agent has been previously pasted on the under face of the second resin sheet B, both of the first and second resin sheets A, B can be joined to each other by the above sticking (the fifth step). Thereafter, the so-integrated resin sheets A, B are subjected to a process of trimming the periphery, providing the finished wire harness W1 of FIG. 1.

Figure 13:
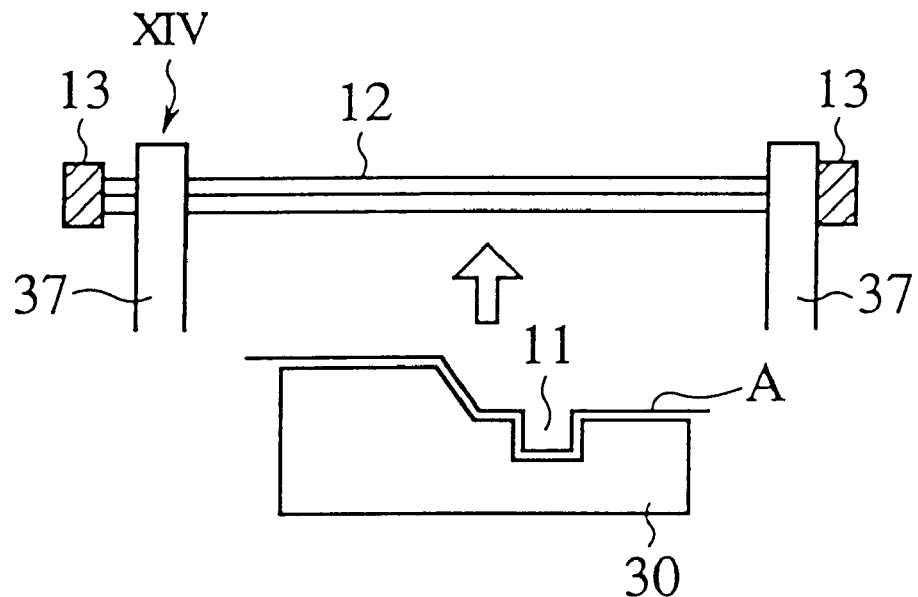
FIG. 13 is an explanatory diagram of the method of manufacturing the wire harness, showing a condition that the electrical wires are arranged by another method as the second step.
Figure 14:
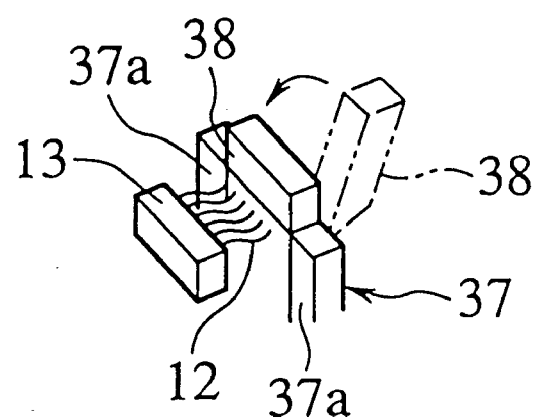
FIG. 14 is an explanatory diagram of the method of manufacturing the wire harness, showing a perspective view of a part XIV of FIG. 13.
Figure 15:
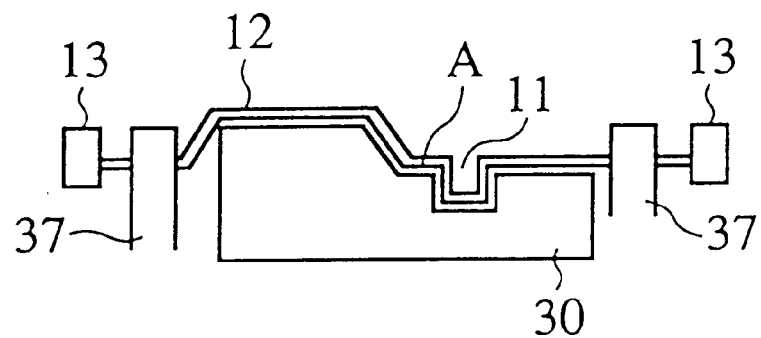
FIG. 15 is an explanatory diagram of the method of manufacturing the wire harness, showing a condition that a process shown in FIG. 13 has been completed.
Figure 16:
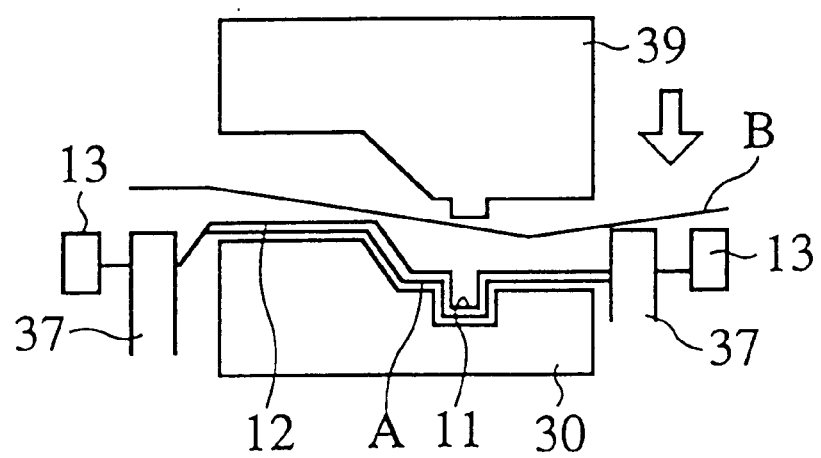
FIG. 16 is an explanatory diagram of the method of manufacturing the wire harness, showing a condition that the second resin sheet is about to be formed in a vacuum after the processes shown in FIGS. 13 and 15.

As a modification of the above-mentioned wiring process of FIG. 11, a bundle of wires 12 may be accommodated in the recess 11 by a method of rising the vacuum-molding die 30 with the first resin sheet A against the bundle of wires 12 previously-wired by wiring tools 37 and sequent urging the bundle of wires 12 from the underside, as shown in FIGS. 13 and 15. Alternatively, the bundle of wires 12 may be lowered to the vacuum-molding die 30. In such a case, as shown in FIG. 14, it is preferable that each wiring tool 37 has a pivot lid 38 formed on respective upper ends of opposing struts 37a in order to prevent the wires 12 from slipping out a space between the struts 37a, 37a. Additionally, if it is difficult to accommodate the wires 12 in the recess 12 of the first resin sheet A, the wires 12 may be depressed into the recess 11 by pressing the upper die 39 down at the sequent step of deforming the second resin sheet B, as shown in FIG. 16. It should be noted that, after molding the second resin sheet B in vacuum, processes similar to those mentioned above will be applied to the wire harness.

The above-mentioned method of manufacturing is applicable to not only the three-dimensional wire harness but also a "two-dimensional" flat wire harness.

Figure 17:
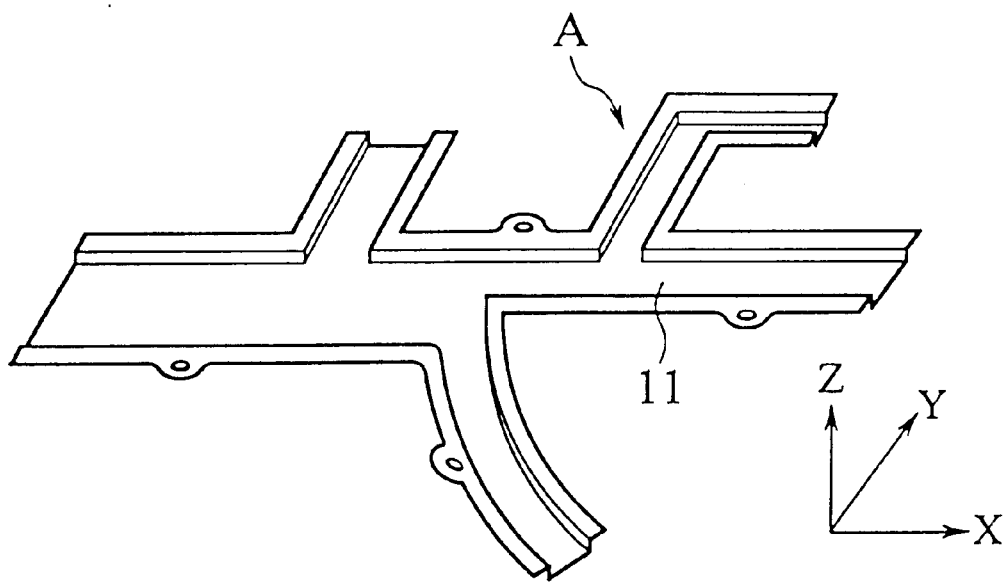
FIG. 17 is a perspective view of the first resin sheet of the wire harness in accordance with a second embodiment of the present invention.
Figure 18:
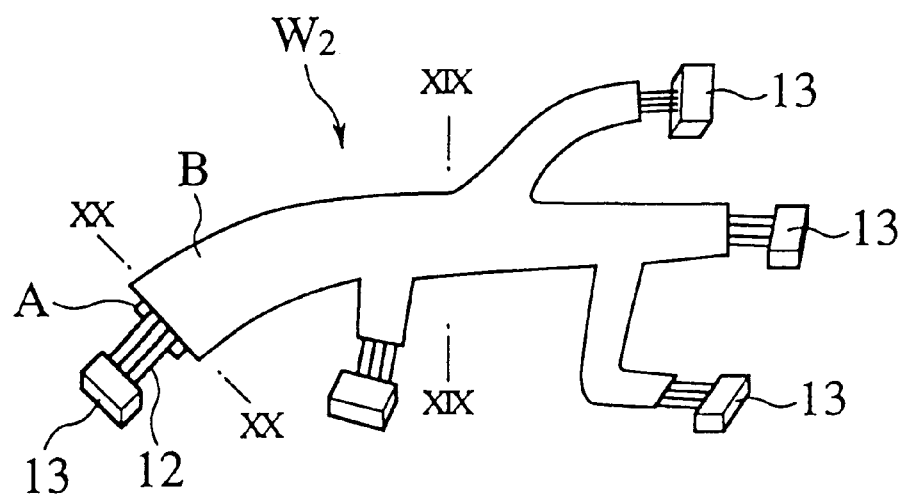
FIG. 18 is a plan view of the wire harness in accordance with the second embodiment of the present invention.

In case of manufacturing the two-dimensional wire harness, the first resin sheet A is formed so as to have a two-dimensional configuration in advance, as shown in FIG. 17. Then, by wiring the electrical wires 12 in the recess 11 of the sheet A and sequent sticking and joining the second resin sheet B to the first resin sheet B, it can be obtained of a flat wire harness W2 shown in FIG. 18.

Figure 19:
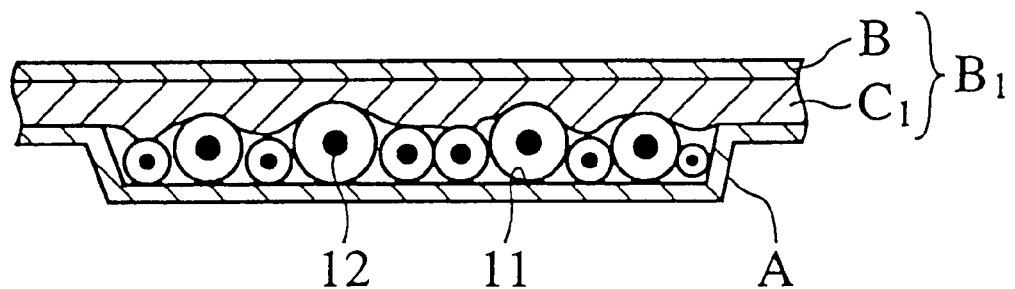
FIG. 19 is a cross sectional view of the wire harness, taken along a line XIX—XIX of FIG. 18.

Also in this case, as shown in FIG. 19, by vacuum-molding the second resin sheet B with the adhesive agent C1, it is possible to join the first and second resin sheets A, B to each other, simultaneously.

Figure 20:
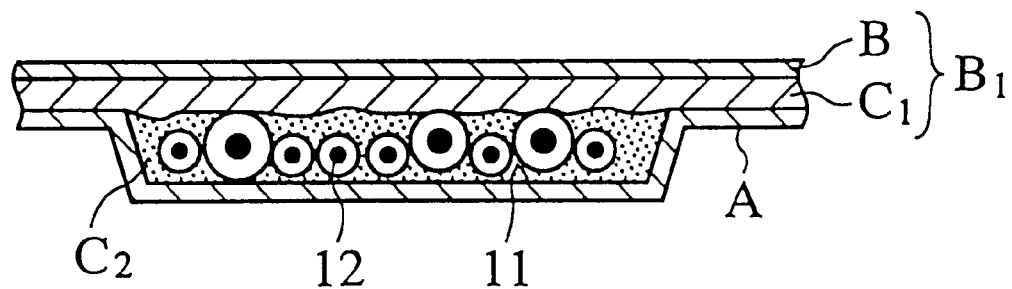
FIG. 20 is a cross sectional view of the wire harness, taken along a line XX—XX of FIG. 18.

Hereat, since the "hot-melt" type of adhesive agent has been previously pasted on the under face of the second resin sheet B, both of the first and second resin sheets A, B can be joined to each other by the above sticking (the fifth step). In addition, as shown in FIG. 20, when plastic sealant C2 such as butyl rubber is charged at respective ends of the first and second resin sheets A, B where the electrical wires 12 are projecting out, it is possible to seal up clearances defined among both resin sheets A, B and the respective wires 12 at wire-leading sections of the wire harness.

Consequently, it is possible to provide a waterproof wire harness suitable for use under the wettish circumstances. Moreover, with the clearances closed up, it is possible to improve the suction efficiency in vacuum-molding the second resin sheet B, so that the stickiness (bonding force) between the first and second resin sheets A, B can be improved.

Figure 21:
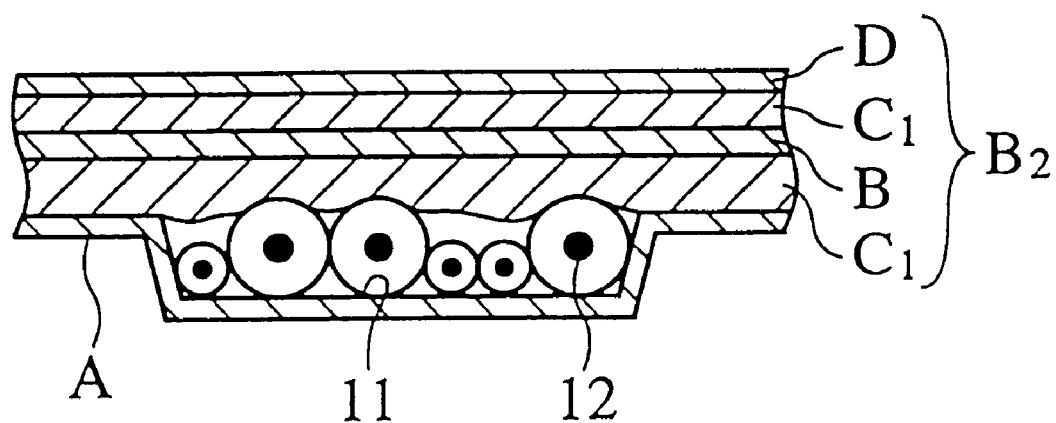
FIG. 21 is a cross sectional view of the wire harness, showing a modification of a part of FIG. 19.

As shown in FIG. 21, in case that a double adhesive sheet B2 having both faces coated with the adhesive agent C1 is adopted as the second resin sheet, it is possible to stick it to the vehicle body etc. if only peeling a peeling paper, so that the attaching operation of the wire harness can be simplified. In addition, owing to its bonding by surfaces, the wire harness can be held stably thereby to prevent an occurrence of noise.

Figure 22A:
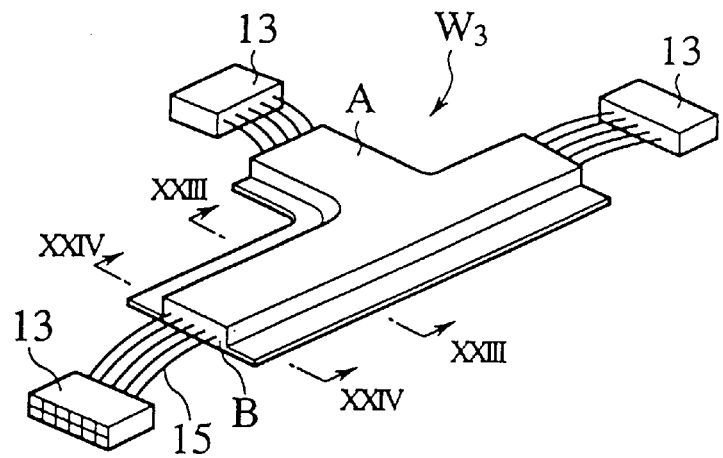
FIG. 22A is a perspective view of the wire harness in accordance with a third embodiment of the present invention.

With reference to a wire harness W3 shown in FIG. 22A, the charging of the plastic sealant C2 into the wire-leading sections will be carried out as follows.

Figure 22B:
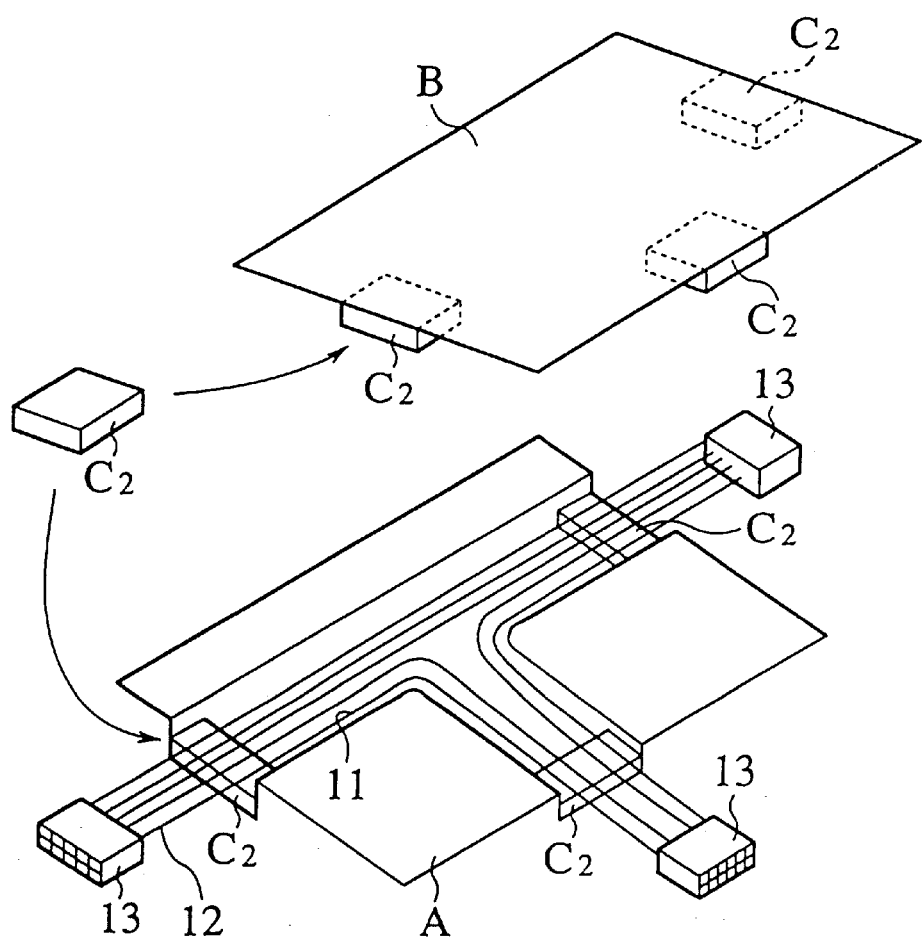
FIG. 22B is a perspective view of the exploded wire harness of FIG. 22A, which is usable for an explanation of the method of manufacturing the wire harness.
Figure 23:
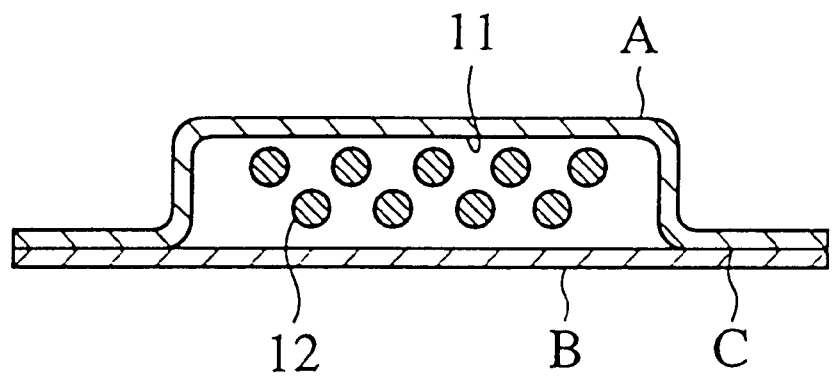
FIG. 23 is a cross sectional view of the wire harness, taken along a line XXIII—XXIII of FIG. 22A.
Figure 24:
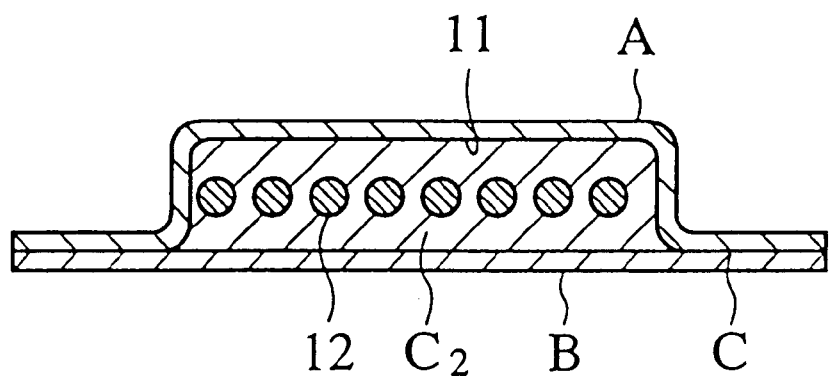
FIG. 24 is a cross sectional view of the wire harness, taken along a line XXIV—XXIV of FIG. 22A.

According to the method, a plurality of blocks of the sealant C2 are arranged to respective positions requiring the sealing, prior to the vacuum-molding of the second resin sheet B. It will be understood that the positions requiring the sealing correspond to respective terminals of the recess 11 in the first resin sheet A, while portions opposing to the terminals in the second resin sheet B, as shown in FIG. 22B. Under such a condition that the blocks are arranged, the vacuum-molding is executed to the first and second resin sheets A, B. Consequently, the sealant C2 melts and then solidifies thereby to fill up the clearances among the electrical wires 12 and the resin sheets A, B, as shown in FIG. 24. In connection, if the wires 12 are arranged so as not to intersect with each other as shown in the figure, the reliable sealing capability would be realized. Note, such a sealing structure would become effective if only arranging the sealant C2 at each terminal of the recess 11. Therefore, as shown in FIG. 23, it does not matter whether clearances are defined among the electrical wires 12 in other portions of the wire harness besides the terminals of the recess 11.

Figure 25:
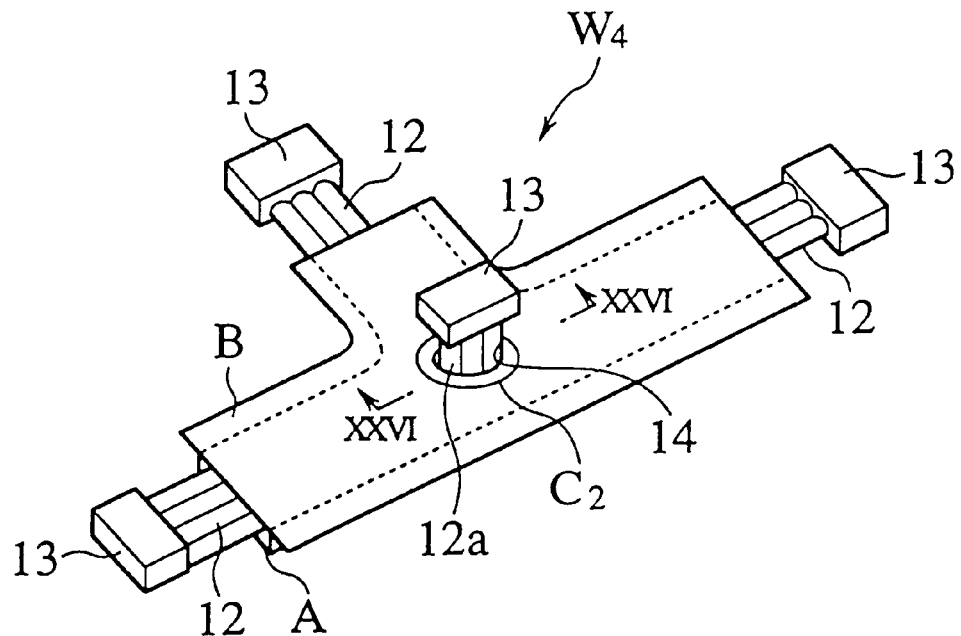
FIG. 25 is a perspective view of the first resin sheet of the wire harness in accordance with a fourth embodiment of the present invention.
Figure 26:
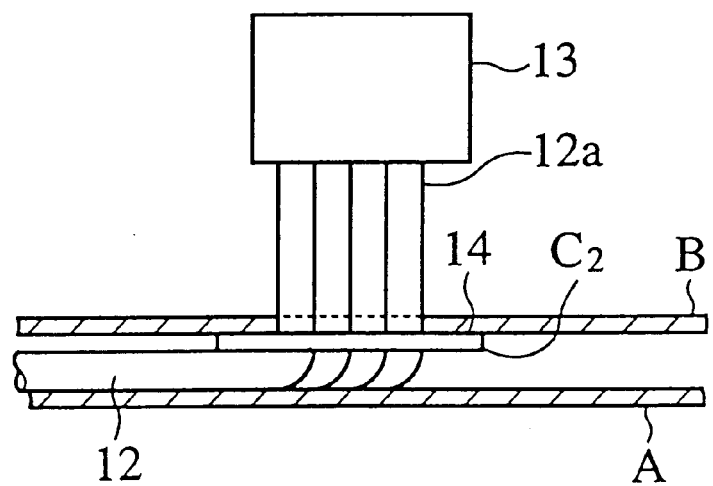
FIG. 26 is a cross sectional view of the wire harness, taken along a line XXVI—XXVI of FIG. 25.
Figure 27:
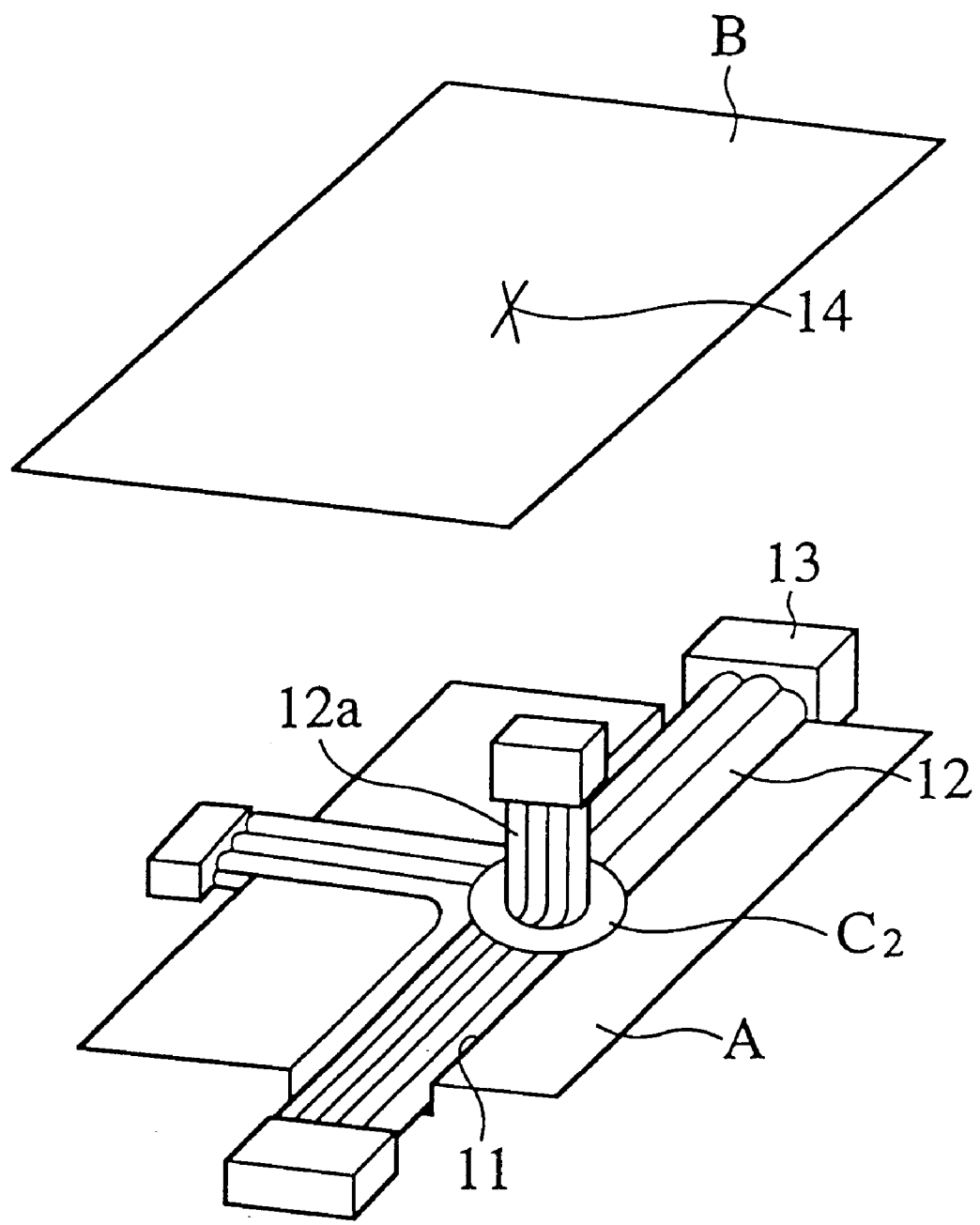
FIG. 27 is a perspective view of the exploded wire harness of FIG. 25, which is usable for an explanation of the method of manufacturing the wire harness.

Referring to FIG. 25, in case of leading the branch wires 12a to a direction perpendicular to surfaces of the resin sheets A, B, it is general that the resin sheet B is provided with a through hole 14 (slitting) though which the branch wires 12a are drawn out. Therefore, a clearance (annular gap) is formed between the through hole 14 and a bundle of branch wires 12a. According to the embodiment, prior to the vacuum-molding, the plastic sealant C2 is charged between the first resin sheet A and the second resin sheet B in order to close the clearance, as shown in FIG. 27. In this way, at the same time of vacuum-molding, it is possible to fill the clearance with the sealant C2 thereby to seal up the through hole 14 (FIG. 26).

Also in this case, it is possible to make sure of its waterproof performance and progress the suction efficiency during vacuum-molding, so that the integration (stickiness) of the first and second resin sheets A, B can be improved.

Note that, as proper materials for the plastic sealant C2, the above-mentioned adhesive agent C1, gel elastomer, foaming material, elastomer of low hardness, sulfurless silicon rubber or the like are applicable to it.

As mentioned above, according to the present invention, since the first resin sheet is provided with the recess for accommodating the electrical wires therein, the resultant wire harness can be provided to have a configuration (two or three-dimensional shape) profiling the actual wiring route of the electrical wires. Therefore, it is possible to improve the assembling property and the holding condition to the vehicle body, so that the occurrence of noise can be prevented. Furthermore, since the worker has only to arrange the wires in position while following to the actual wiring route, the wire harness of the invention can be produced by making use of the existing wire harness. Additionally, since the wires are protected by both resin sheets, it is possible to prevent the wires from being damaged certainly in comparison with the protection by a tape wound about the wires.

Finally, it will be understood by those skilled in the art that the foregoing description is one of preferred embodiments of the disclosed wire harness, and that various changes and modifications may be made to the present invention without departing from the spirit and scope thereof.

What is claimed is:

1. A method of manufacturing a wire harness having a first resin sheet, electrical wires and a second resin sheet joined, said method comprising:

a first step of forming said first resin sheet having a cross section along a width of the first resin sheet defining a substantially U-shaped recess, said recess extending along a predetermined wiring route of said electrical wires;

a second step of disposing said electrical wires in said substantially U-shaped recess formed in the first step;

a third step of putting said second resin sheet on said first resin sheet in a manner that said second resin sheet covers at least said recess;

a fourth step of evacuating air between said first resin sheet and said second resin sheet so that said first resin sheet is stuck to said second resin sheet while interposing said electrical wires therebetween; and a fifth step of joining said first resin sheet and said second resin sheet to each other.

2. The method of manufacturing the wire harness as claimed in claim 1, wherein said first step further comprises a step of boring a suction hole in said first resin sheet after or simultaneously with forming said substantially U-shaped recess in said first resin sheet, whereby the air between said first resin sheet and said second resin sheet can be evacuated through said suction hole.

\* \* \* \* \*